United States Patent
Hsu et al.

[11] Patent Number: 6,080,454
[45] Date of Patent: Jun. 27, 2000

[54] PROCESS FOR PRODUCING STAINED CRYSTALLIZED GLASS AND ITS ARTICLES

[75] Inventors: Kuo-Chuan Hsu; Ching-Hsi Lin; Hsien-Chung Tsai, all of Hsinchu, Taiwan

[73] Assignee: China Glaze Co., Ltd., Hsinchu, Taiwan

[21] Appl. No.: 08/934,650

[22] Filed: Sep. 22, 1997

Related U.S. Application Data

[62] Division of application No. 08/735,586, Oct. 23, 1996, Pat. No. 5,820,647.

[51] Int. Cl.$^7$ .................................................. C03B 19/09
[52] U.S. Cl. ............................................. 428/15; 428/38
[58] Field of Search ........................................ 428/15, 38

[56] References Cited

U.S. PATENT DOCUMENTS

| | | | |
|---|---|---|---|
| 4,192,666 | 3/1980 | Lupoi | 427/229 X |
| 4,197,105 | 4/1980 | Hummel et al. | 427/229 X |
| 5,066,524 | 11/1991 | Baba et al. | 428/38 X |

*Primary Examiner*—Henry F. Epstein
*Attorney, Agent, or Firm*—Rosenberg, Klein & Bilker

[57] ABSTRACT

A process for producing stained crystallized glass and its articles is provided where crystallized glass is obtained with patterns and colors like that of granites, marble, and other natural stones. The process includes the heat-treatment of a prepared batch of crystallizable glass granules, colored powder and water, at a temperature higher than the softening point of the glass granules resulting in fusion bonding of the glass granules. The colored powder is compounded by an inorganic pigment, a suspension stabilizing agent, an agglomerate, a deflocculant agent, and a crystallizable glass powder. The surface pattern is formed by the grain boundary region of the crystallizable glass granules, and part of the inorganic pigment in the colored powder moving with the crystallizable glass powder.

1 Claim, 2 Drawing Sheets

PROCESS FOR PRODUCING STAINED CRYSTALLIZED GLASS AND ITS ARTICLES

This is a divisional of application Ser. No. 08/735,586 filed on Oct. 23, 1996, now U.S. Pat. No. 5,820,647.

BACKGROUND OF THE INVENTION

1. Field of the Invention

The present invention relates to a process of producing stained crystallized glass and its articles. In particular, the present invention refers to a method for obtaining crystallized glass with patterns and colors resembling that of granites, marbles, and other stones, and applying such to an incombustible construction material.

The "crystallized glass" of this invention refers to crystallized glass formed by the softening and deformation of the glass through heat-treatment at a temperature higher than the softening point, simultaneously with needle-like crystals precipitating from the surface of the glass toward the interior part, in a direction normal to the surface. "Crystallized glass" refers to the crystallizable glass having crystals in the interior after heat-treatment, there being a coexistence of glass and crystals as shown in FIG. 5, in which A indicates a crystalline phase of needle-like crystals of β-wollastonite, and B indicates a remaining portion of the crystallizable glass.

2. Prior Art

Crystallized glass obtained by heat-treating crystallizable glass is characterized as having excellent mechanical strength, heat-resistance, chemical corrosion strength, and water resistance, thus it can be used in various fields.

Nowadays, crystallized glass has been used in construction, replacing natural stones due to its excellent characteristics, and has obtained great popularity.

In the prior art, the method of staining crystallized glass is by adding oxide of Fe, Co, Ni, Cu, or Mn . . . etc. to the glass material as a stain. With the application of high heat, the stain is fusion bonded with the glass material. Thus, stained crystallized glass is deformed by the heat-treatment of such crystallizable glass. However, the process of producing crystallized glass has disadvantages as listed below:

1. The stain added in the glass material is consistently an oxide composed of transition elements, such as Fe, Mn, Co, Cu, . . . etc. Most transition elements contain more than two ionic conditions, which usually changes its ionic valence with increasing heat during the crystallization process. The color of crystallized glass will be altered with the alteration of relative capacity between two different ionic charges and results in color aberration. As in the disclosure of Japanese Patent Publication No. 53-39884, black crystallized glass can be obtained by adding $Fe_2O_3$ as a stain. However, the following are problems and disadvantages of the process disclosed in Japanese Patent Publication No. 63-201037:

a) During the heat-treatment of the crystallization process, the hue of the stain will be altered with the transfer from $Fe^{2+}$ to $Fe^{3+}$. Thus, the black hue of crystallized glass comes out unsteady and uneven.

b) For production of an arcuate plate of crystallized glass, a heat-treatment is applied to a previously completed flat crystallized glass plate. A temperature of 800° C.~900° C. is used to bend the plate, which temperature will absolutely cause the transfer from $Fe^{2+}$ to $Fe^{3+}$ and result in an obvious color aberration. The color aberration will be more obvious when a flat crystallized glass plate and an arcuate crystallized glass plate are bonded together in an application.

Further, it has been found that while CuO is added to crystallizable glass, as stain for green crystallized glass, the color of the completed crystallized glass is between green and brown in an uneven state, due to the unpredictable alteration of relative capacity of $Cu^+$ and $Cu^{2+}$ in the fusion glass.

2. During the melting process in a furnace, the method of adding an oxide stain to the glass material for producing crystallized glass that only suits production of few varieties in large quantities, instead of production of many varieties in small quantities.

Accordingly, the Japanese Patent Publication No. 5-43651 and Patent Publication No. 130902 of the Republic of China disclose an improvement by mixing crystallizable glass with inorganic pigment prior to the heat-treatment process to produce crystallized glass articles. This prior art indeed reaches the goal of production of many varieties in small quantities, and avoids color aberration owing to the use of an inorganic oxide pigment with property of high heat-resistance, preventing ionization when being heat-treated with the crystallized glass. The step of adding water is used in this process for compounding glass granules and a powdery inorganic pigment, as a batch, that is poured into a refractory mold and formed as stained crystallized glass by a crystallization heat-treatment. In the above described process, water is regarded as a media for compounding glass granules and an inorganic pigment as a batch, which is heat-treated at 1100° C. for an hour to precipitate β-wollastonite in the glass, and fusion bonding the batch into a body. In this process, the softening point of crystallizable glass is at about 700° C. However, the fusion of glass granules begins at 850° C. and the vaporization temperature of water is 100° C. That is to say, the bonding media (water) no longer exists during the heat-treatment of the glass and inorganic pigment at a temperature higher than 110° C. Therefore, when the glass granules get softened, part of the inorganic pigment directly contacts the glass granules and will simultaneously move with the glass granules. While the portion of the inorganic pigment that fails to contact the glass granules will float on the surface of softened glass, because of an absence of an attractive force, and will be isolated like an island in the sea, resulting in a discontinuity of the pigment that causes spots in the completed crystallized glass.

OBJECTS OF THE INVENTION

The main object of the present invention is to solve the problems of the prior art. The present invention provides a process of producing stained crystallized glass, which can not only solve the problem of color aberration and spots, but also obtain an appearance much like that of natural stones.

The second object of the present invention is to produce stained crystallized glass articles presenting a natural pattern without color aberration and spots.

SUMMARY OF THE INVENTION

The present invention provides a combination between crystallizable glass granules and an inorganic pigment, making the inorganic pigment evenly adhere to the surface of the crystallizable glass granules and granule boundaries, and can obtain a stained crystallized glass with an even color and a natural stone appearance after the crystallization heat-treatment. The process of this invention includes the following steps:

1. Preparing crystallizable glass granules which have the property of softening and precipitating crystals under a heat-treatment, at temperature higher than the softening point temperature.

2. Obtaining a colored powder by crushing a dried glaze pulp that is compounded by the crystallizable glass powder of Step 1, an inorganic pigment, a suspension stabilizing agglomerate, a deflocculant agent, water as an additive, and then formed by grinding with a ball mill.

3. Adding a proper amount of water and agglomerate to the glass granules of Stop 1 with the color powder of Step 2, then completing a perfectly bonded batch of crystallizable glass granules and color powder through stirring, drying, and screening. When this batch is heat-treated at a temperature higher than the softening point of the glass granules, the color powder containing crystallizable glass powder of tiny granules (<180 um), which have previously been softened, to form a continuous network at the periphery of glass granules, to which the inorganic pigment adheres and moves with the glass powder. The inorganic pigment, therefore, presents a continuous, even distribution without spots occurring after heat-treatment.

4. Pouring the batch completed in Step 3 into a mold as shown in FIG. 3, heat-treating at temperature higher than the softening point for fusion bonding of each of the glass granules and precipitation of crystals, as shown in FIG. 4. Meanwhile, the inorganic pigment will form a staining layer distributed evenly at the surface of glass granules and granule boundaries.

The obtained crystallizable glass in this invention can be softened for deformation and precipitate crystals under heat-treatment at a temperature higher than the softening point of the glass granules.

The obtained inorganic pigment in this invention has a heat-resistant property in addition to being the required color. If the pigment ionizes when being heat-treated with the crystallizable glass, is able to combine with crystallizable glass. This kind of inorganic pigment includes staining oxides such as Cd—Se, Er—Si—Se—Cd, Er—Si—Cd, Cu—Cr—Co, Er—V—Si, Co—Si, Co—Al, Co—Al—Er, Co—Cr, Er—Si—V—Co, Cr, Cr—Al, Er—Si—V—Pr— Fe, Er—Si—Cr, Er—Si—V—Pr, Cr—Ca—Si, Er—Si—Pr, Er—V, Cu—V, Er—V—Fe, Er—Si—Pr—Fe, Er—Fe—Si, Er—Fe, Cu—Cr—Ca—Si, Cu—Cr—Fe, Ti—Sb—Cr, Fe—Cr—Eu, Fe—Cr—Eu—Al, Er—Co—Ni, Cu—Sb, Ni—Er, Er—Co—Ni—Si, Co—Fe—Eu, Er—Co—Si, Fe—Cr, Cr—Co—Fe—Ni, and staining oxides formed from mixtures of the above series.

BRIEF DESCRIPTION OF THE PREFERRED EMBODIMENTS

A fusion crystallizable glass that is a transparent viscose glass fused from a batch of crystallizable glass materials in a fusion furnace at 1450° C. is poured into cool water for water quenching, to result in crushed glass granules which are collected for use after being dried and screened. The screening process maintains a certain grain fineness between 0.4~7 mm. The grain fineness will not only influence the staining effect when it is less than 04. mm, but also the crystallization treatment when it is larger than 7 mm.

Preparing process of color powder:

After adding an inorganic pigment of the required color, a suspension stabilizing agent, an agglomerate, a deflocculant agent, and water to the above crystallizable glass granules, the batch is ground in a globe mill for about 4 hours to form a viscose liquid with a grain fineness distribution of 5~80 um, called a glaze liquid. After the glaze liquid is dried, the remainder is crushed into a colored powder with a grain fineness less than 0.2 mm, the finer the better. The colored powder includes 5~50$^{WT}$ % of an inorganic pigment, 5~15$^{WT}$ % of a suspension stabilizing agent, 0.1~0.5$^{WT}$ of an agglomerate, 0.1~3.0$^{WT}$ % of a deflocculant agent, and 40~70 ml of water with an additional 100 g of colored powder as a dispersing medium. The content limit of 5~50$^{WT}$ % of the inorganic pigment in the colored powder is due to the fact that if it is less than 5$^{WT}$ %, the color will be too light when staining, while if it is greater than 50$^{WT}$ %, the inorganic pigment will become a hindrance to the fusion and flow of the glass granules. The limit of the suspension stabilizing agent at 5~15$^{WT}$ % is due to the fact that if it is less than 5$^{WT}$ %, the suspension stabilizing effect is influenced by the precipitate of glaze liquid. When it is higher than 15$^{WT}$ %, the suspension stabilizing agent, with a high refractory quality, will also raise the refractory quality of the colored powder and decelerate the fusion bonding of the glass granules. The agglomerate functions to increase the viscosity of the water and decrease the precipitate of floating grains in the glaze liquid and is limited to 0.1~0.5$^{WT}$ %, in order to avoid too much precipitate caused by the low viscosity of the water, the dispersing medium when the agglomerate content is less than 0.1$^{WT}$ %. Further, if the content exceeds 0.5$^{WT}$ %, the ground glaze liquid will be too thick to pour into a mold.

Figure 1:
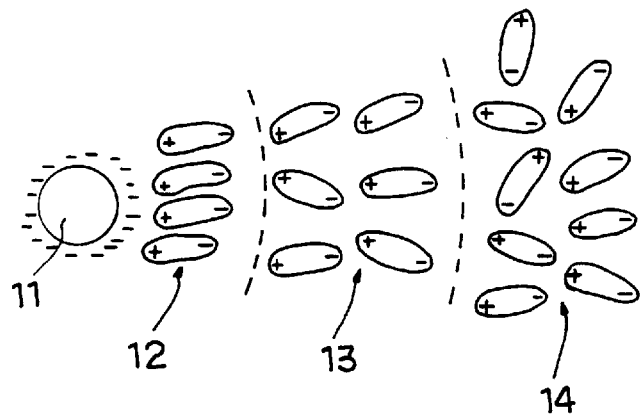
FIG. 1 is an illustration schematically showing the function of a deflocculant agent in this invention.

Water glass, pure base, and organic natrium salt are usually used as a defloculant agent functioning to increase the fluidity of the glaze liquid. In the glaze liquid of the present invention, the deflocculant agent works mainly to substitute fixed bound water 2 at the periphery of crushed glass powder of the suspension stabilizing agent 11, to thereby increase the content of unfixed bound water 13 and free water 14 as shown in FIG. 1, elevating the fluidity of the glaze liquid and efficiency of globe grinding. The content limit of the deflocculant agent at 0.1~3.0$^{WT}$ % is due to the fact that if it is less than 0.1$^{WT}$ %, incomplete dispersion will decrease the fluidity of the glaze liquid and the efficiency of globe grinding. If it is more than 3.0$^{WT}$ %, not only will the cost be increased, but will cause precipitation of the glaze liquid after bound water at the periphery of the glass granules are substituted by Na$^+$ in the deflocculant agent. 40~70 ml of water will not only make the glaze liquid become too thick to pour into a mold, but also decrease the efficiency of globe grinding. With more than 70 ml of water, the glaze liquid will be too watery to be dried in the next process.

Figure 2:
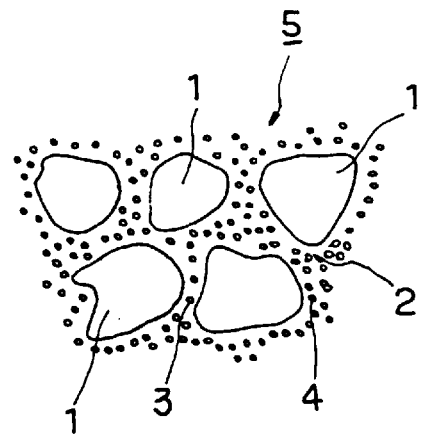
FIG. 2 is an illustration of the structure of a batch of stained crystallizable glass granules in this invention.
Figure 4:
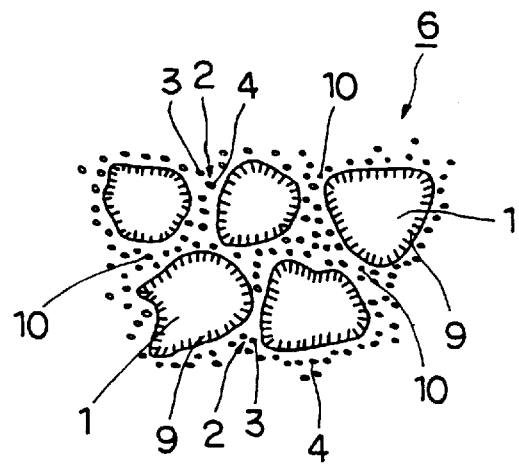
FIG. 4 is an illustration of the structure of the result of the batch shown in FIG. 3 after the crystallization heat-treatment.
Figure 5:
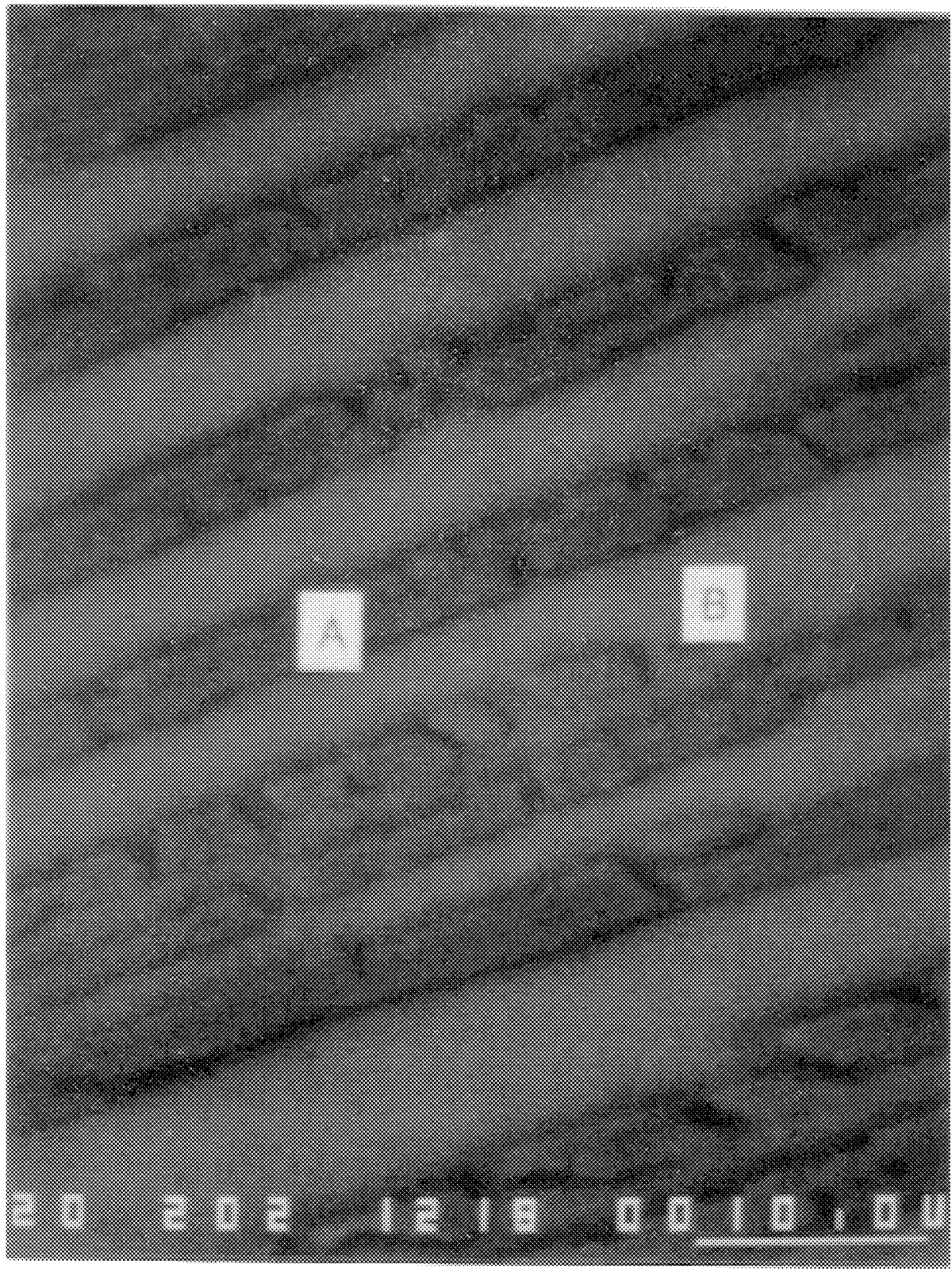
FIG. 5 is an electron microscopic view of the coexisting organization of crystals (indicated as A) and glass (indicated as B) resulting form heat-treating the crystallizable glass.

The staining of crystallizable glass granules:

As shown in FIG. 2, stirring crystallizable glass granules 1 with colored powder 2 and a certain content of water in a stirring machine to complete a batch 5. The batch 5 has a crystallizable glass powder 3 and an inorganic pigment 4 of the colored powder 2 evenly adhered to the surface of the crystallizable glass granules 1. With respect to the crystallizable glass granules 1, the batch should contain 4~20% of the colored powder, and 2~20% of water. If the colored powder is less than 4%, the stain color will be too light. If the colored powder is more than 20%, the color will be too dark and involve too large a region, which will spoil the smooth pattern of crystallized glass 6, as shown in FIG. 4. A water content of less than 2% will make the batch incompletely compounded, while a content of more than 20% will make the colored powder 2 incompletely adhere to the surface of the crystallizable glass granules 11 and result in too much of the colored powder 2 remaining.

Figure 3:
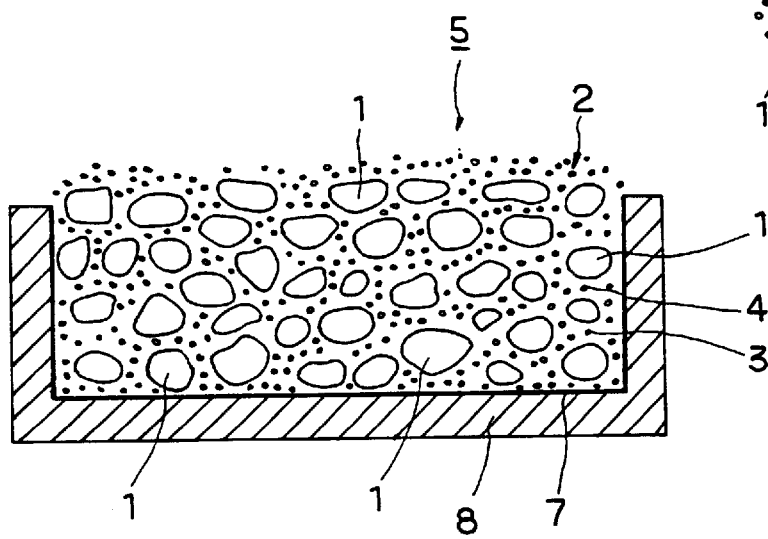
FIG. 3 is an illustration of the batch shown in FIG. 2 poured in a mold before the crystallization heat-treatment.

Crystallization heat-treatment:

The stirred batch 5 of the previous process is poured into a refractory mold 8 having mold release 7 applied thereto, as shown in FIG. 3, and is then subjected to a heat-treatment at a temperature higher than the softening point of the crystallizable glass.

With the elevation of temperature, a plurality of crystallizable glass granules begin fusing to each other along with the interface region. Simultaneously, needle-like crystals are precipitated from both the crystallizable glass granules and the crystallizable glass powder, as shown in FIG. 4. The inorganic pigment 4 distributes evenly in the interface 10, to form a bonded body of crystallizable glass powder 3 and inorganic pigment 4 in the interface 10. After cooling and polishing the surface, the crystallized glass has a surface pattern formed by the stained main body and the stained grain boundary strip.

Two preferred embodiments of the present invention will be described hereinunder:

First Embodiment:

Glass granules with a diameter of 1~3 mm are collected through the processes of fusion at 1450° C., water quenching, and drying. The glass material comprising 58% of $SiO_2$, 6.0% of $Al_2O_3$, 19% of CaO, 1.9% of $K_2O$, 2.1% of $Na_2O$, 1.0% of $B_2O_3$, 7.0% of ZnO, 5.0% of BaO. Then, 20% of a pigment of Zr—Co—Ni series, 10% of a water-scrubbed China-clay suspension stabilizing agent, 0.1% of a CMC (Carboxymethyl Cellulose) agglomerate, 0.2% of an STPP (Sodium Tripolyphosphate) deflocculant agent, and 60% water are added to the crystallizable glass granules and globe ground into a viscose liquid which is dried and crushed to form a colored powder. 20% of the colored powder relative to the weight of the glass granules being stained, are added with the crystallizable glass granules for stirring with a 10% water content in a stirring machine for 10 minutes. A refractory mold having $Al_2O_3$ applied thereto is prepared for containing the batch of crystallizable glass granules and colored powder. After being added to the mold, the composition is then heat-treated at 1100° C. for 1.5 hours. In this way, not only the β-wollastonite is precipitated from the crystallizable glass granules and crystallizable glass powder of the colored powder, but also provides a perfectly bonded body of crystallizable glass granules and colored powder, an unfinished plate, that is formed simultaneously with the bonding of the crystallizable glass granules to the crystallizable glass powder. The unfinished plate is polished after cooling to obtain a smooth crystallized glass plate with a gray color.

Second Embodiment:

Glass granules with a diameter of 3~7 mm are collected through the processes of fusion at 1450° C., water quenching, and drying. The glass material comprising 58% of $SiO_2$, 6.0% of $Al_2O_3$, 18.6% of CaO, 1.9% of $K_2O$, 2.1% of $Na_2O$, 1.0% of $B_2O_3$, 7.0% of ZnO, 5.0% of BaO, 0.4% of CuO. Then, 20% of a pigment of Cr—Co—Fe—Ni series, 8% of a water-scrubbed China-clay suspension stabilizing agent, 0.1% of CMC (Carboxymethyl Cellulose) agglomerate, 0.5% of STPP (Sodium Tripolyphosphate) deflocculant agent, and 60% water are added to the crystallizable glass granules and globe ground into a viscose liquid which is dried and crushed to form a colored powder. 10% of the colored powder relative to the weight of the glass granules to be stained are added with the crystallizable glass granules for stirring with a 5% water content in a stirring machine for 10 minutes. A refractory mold having $Al_2O_3$ applied thereto is prepared for containing the batch of the crystallizable glass granules and the colored powder. After being added to the mold, the composition is heat-treated at 1100° C. for 1.5 hours. In this way, not only the β-wollastonite is precipitated from the crystallizable glass granules and the crystallizable glass powder of the colored powder, but also provides a perfectly bonded body of crystallizable glass granules and colored powder completed, an unfinished plate, formed simultaneously with the bonding of the crystallizable glass granules and the crystallizable glass powder. Thus, a crystallized glass plate with a surface pattern formed by a green main body and strip of black within grain boundary is obtained after cooling and polishing of the unfinished plate.

What is claimed is:

1. A stained crystallized glass article, comprising a bonded body formed in a mold. said bonded body being compounded from a plurality of crystallizable glass granules having a grain fineness within the approximating range of 0.4 mm to 7.0 mm in which needle-like crystals are formed and a color staining oxide composition having a grain size in the approximating range of 5–80 um, said staining oxide composition being disposed in interfaces between said plurality of crystallizable glass granules and being of a type selected from the group consisting of oxides of: Cd—Se, Er—Si—Se—Cd, Er—Si—Cd, Cu—Cr—Co, Er—V—Si, Co—Si, Co—Al, Co—Al—Er, Co—Cr, Er—Si—V—Co, Cr, Cr—Al, Er—Si—V—Pr—Fe, Er—Si—Cr, Er—Si—V—Pr, Cr—Ca—Si. Er—Si—Pr, Er—V, Cu—V, Er—V—Fe, Er—Si—Pr—Fe, Er—Fe—Si, Er—Fe, Cu—Cr—Ca—Si, Cu—Cr—Fe, Ti—Sb—Cr, Fe—Cr—Eu, Fe—Cr—Eu—Al Er—Co—Ni, Cu—Sb, Ni—Er, Er—Co—Ni—Si, Co—Fe—Eu, Er—Co—Si, Fe—Cr, and Cr—Co—Fe—Ni, said bonded body being formed by fusion bonding said compound by heating at a temperature above a softening point thereof, said heating precipitating said needle-like crystals from each of said crystallizble glass granules in various directions to form a stained crystallized glass without spots and having a pattern like that of natural stones.

* * * * *